(12) United States Patent
Hasegawa

(10) Patent No.: US 11,357,312 B2
(45) Date of Patent: Jun. 14, 2022

(54) WORKING MACHINE SUPPORT BELT

(71) Applicant: HONDA MOTOR CO., LTD., Tokyo (JP)

(72) Inventor: Tetsuya Hasegawa, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 49 days.

(21) Appl. No.: 16/609,625

(22) PCT Filed: Nov. 30, 2018

(86) PCT No.: PCT/JP2018/044239
§ 371 (c)(1),
(2) Date: Oct. 30, 2019

(87) PCT Pub. No.: WO2020/110302
PCT Pub. Date: Jun. 4, 2020

(65) Prior Publication Data
US 2021/0161278 A1 Jun. 3, 2021

(51) Int. Cl.
*A45F 3/14* (2006.01)
*A01D 34/90* (2006.01)

(52) U.S. Cl.
CPC .............. *A45F 3/14* (2013.01); *A01D 34/90* (2013.01); *A45F 2003/142* (2013.01); *A45F 2003/144* (2013.01); *A45F 2003/146* (2013.01)

(58) Field of Classification Search
CPC .................................. A45F 3/14; A01D 34/90
(Continued)

(56) References Cited

U.S. PATENT DOCUMENTS 2,441,115 A * 5/1948 Lambert ................... A45F 5/00
224/259
2,651,441 A * 9/1953 Rau ........................... A45F 3/14
224/264

(Continued)

FOREIGN PATENT DOCUMENTS

CN 2267636 Y 11/1997
CN 1536969 A 10/2004
(Continued)

OTHER PUBLICATIONS

Apr. 17, 2020, European Search Report issued for related EP Application No. 18915792.8.
(Continued)

*Primary Examiner* — Nathan J Newhouse
*Assistant Examiner* — Lester L Vanterpool
(74) *Attorney, Agent, or Firm* — Paratus Law Group, PLLC

(57) ABSTRACT

A working machine support belt includes: a back plate portion; a left shoulder belt and a right shoulder belt; a waist belt; a left suspender band that connects the left shoulder belt and the waist belt; a right suspender band that connects the right shoulder belt and the waist belt; a left side belt that extends left-downward from the back plate portion, turns forward, and is connected to a left end portion of the waist belt; a right side belt that extends right-downward from the upper portion of the back plate portion, turns forward, and is connected to a right end portion of the waist belt; a locking member that locks the left end portion and the right end portion of the waist belt; and a pad member supported via a rear support band and a front support band, and provided with a hook that supports a working machine.

17 Claims, 7 Drawing Sheets

(58) Field of Classification Search
USPC .................................................... 224/257
See application file for complete search history.

(56) References Cited

U.S. PATENT DOCUMENTS

| | | | | |
|---|---|---|---|---|
| 3,453,732 | A * | 7/1969 | Wilkin | A01D 34/902 30/296.1 |
| 3,781,991 | A * | 1/1974 | Stretton | A01D 34/902 30/276 |
| 4,776,504 | A * | 10/1988 | Panth | A45F 5/00 224/640 |
| 4,991,758 | A * | 2/1991 | Eaneff | F16M 13/04 224/264 |
| D330,633 | S * | 11/1992 | Lavin | D3/221 |
| 5,758,809 | A * | 6/1998 | Bonner | A45F 3/14 224/259 |
| 5,913,464 | A * | 6/1999 | Haberlein | A45F 3/14 224/907 |
| 6,247,624 | B1 * | 6/2001 | Rundberg | F16M 13/04 224/604 |
| 6,315,179 | B1 * | 11/2001 | Hillis | A45F 3/14 224/268 |
| 6,729,511 | B2 * | 5/2004 | Dent, III | B65G 7/12 224/259 |
| D503,276 | S * | 3/2005 | Racov | D3/228 |
| 7,040,518 | B2 * | 5/2006 | von Krane | A01G 3/08 224/259 |
| 7,163,132 | B2 * | 1/2007 | Rundberg | A45F 3/14 224/907 |
| 7,331,493 | B2 * | 2/2008 | Dent, III | A44B 11/08 224/259 |
| D641,155 | S * | 7/2011 | Tinius | D3/228 |
| D641,975 | S * | 7/2011 | Tinius | D3/228 |
| 8,418,898 | B2 * | 4/2013 | Carlsson | A01G 3/085 30/296.1 |
| 8,631,984 | B2 * | 1/2014 | Carlsson | A45F 3/14 224/259 |
| 8,807,403 | B2 * | 8/2014 | Nielsen | A45F 3/14 24/171 |
| 8,910,840 | B2 * | 12/2014 | Kamo | A45F 3/14 224/160 |
| 8,925,774 | B2 * | 1/2015 | Mori | A01D 34/902 224/259 |
| 8,978,945 | B2 * | 3/2015 | Komura | G10G 5/005 224/259 |
| 9,044,081 | B2 * | 6/2015 | McDonald | A45F 3/14 |
| 9,204,707 | B2 * | 12/2015 | Ito | A45F 3/14 |
| 10,716,388 | B2 * | 7/2020 | Pellenc | A45F 3/14 |
| 10,905,907 | B1 * | 2/2021 | Dold | B25G 1/102 |
| 2005/0000994 | A1 | 1/2005 | Rundberg | |
| 2006/0102423 | A1 * | 5/2006 | Lang | A62B 35/04 182/36 |
| 2006/0108387 | A1 * | 5/2006 | Nakaya | A01D 34/90 224/268 |
| 2006/0243116 | A1 * | 11/2006 | Chou | G10G 5/005 84/385 A |
| 2009/0090754 | A1 | 4/2009 | Haberlein | |
| 2009/0090755 | A1 * | 4/2009 | Menzel | A45F 3/14 224/268 |
| 2010/0270344 | A1 * | 10/2010 | Mori | A01D 34/902 224/250 |
| 2013/0119100 | A1 * | 5/2013 | Ito | A45F 3/14 224/259 |
| 2013/0119101 | A1 * | 5/2013 | Hachisuka | A01D 34/902 224/261 |
| 2013/0160302 | A1 * | 6/2013 | Pellenc | A45F 5/00 224/259 |
| 2015/0053731 | A1 | 2/2015 | Ito et al. | |
| 2019/0269226 | A1 | 9/2019 | Pellenc et al. | |
| 2020/0323312 | A1 * | 10/2020 | Lennings | A44B 11/2592 |

FOREIGN PATENT DOCUMENTS

| | | |
|---|---|---|
| CN | 101402194 A | 4/2009 |
| CN | 104412771 A | 3/2015 |
| EP | 2594124 A1 | 5/2013 |
| EP | 2850965 A1 | 3/2015 |
| FR | 2999064 A1 | 6/2014 |
| FR | 3055780 A1 | 3/2018 |
| JP | H10-098930 A | 4/1998 |
| JP | 2889555 B2 | 5/1999 |
| JP | 2005-143453 A | 6/2005 |
| JP | 2005143453 A * | 6/2005 |
| JP | 5788768 B2 | 10/2015 |

OTHER PUBLICATIONS

Feb. 26, 2019, International Search Report issued for related PCT Application No. PCT/JP2018/044239.
Feb. 26, 2019, International Search Opinion issued for related PCT Application No. PCT/JP2018/044239.
Dec. 24, 2021, Chinese Office Action issued for related CN Application No. 201880028987.4.

* cited by examiner

WORKING MACHINE SUPPORT BELT

CROSS REFERENCE TO PRIOR APPLICATION

This application is a National Stage Patent Application of PCT International Patent Application No. PCT/JP2018/044239 (filed on Nov. 30, 2018) under 35 U.S.C. § 371, which is hereby incorporated by reference in its entirety.

TECHNICAL FIELD

The present invention relates to a working machine support belt.

BACKGROUND ART

As a working machine support belt for supporting a working machine, such as a mowing machine, with an upper body of a user, there is known a technology including: a back plate; a shoulder belt fixed to the back plate and having a free front end portion; a side belt which extends forward through the left and right armpits from the back plate and of which the front end portion almost ends in a lower range of the chest of the user; a support plate on which working machinery abuts; and a pelvis belt provided below the side belt, in which the support plate is connected to the back plate and the side belt via a support band, and the free front end portion of the shoulder belt is disposed to be apart from the front end portions of each of the pelvis belt and the side belt (Patent Document 1).

According to the working machine support belt of Patent Document 1, the free front end portion of the shoulder belt is positioned to be apart from the front end portions of each of the pelvis belt and the side belt, and thus, it is difficult to apply a load to the chest of the user. Therefore, when using the working machine, it is possible to suppress the occurrence of discomfort due to the feeling of pressure or biting on the chest and abdomen of the user, and to perform work more comfortably.

RELATED ART REFERENCE

Patent Document

Patent Document 1: Japanese Unexamined Patent Application Publication No. 10-98930

SUMMARY OF THE INVENTION

Problems to be Solved by the Invention

However, the working machine support belt of Patent Document 1 has room for improvement in reducing the load on an operator by distributing the load on the working machine to the upper body of the user.

The present invention provides a working machine support belt that can reduce a load on an operator.

Means for Solving the Problems

According to the present invention, there is provided a working machine support belt including: a back plate portion; a left shoulder belt and a right shoulder belt that extend upward from an upper portion of the back plate portion and turn forward; a waist belt that extends from a lower portion of the back plate portion to both sides; a left suspender band that connects a front lower portion of the left shoulder belt and a left rear portion of the waist belt; a right suspender band that connects a front lower portion of the right shoulder belt and the right rear portion of the waist belt; a left side belt that extends left-downward from the upper portion of the back plate portion, turns forward, and is connected to a left end portion of the waist belt; a right side belt that extends right-downward from the upper portion of the back plate portion, turns forward, and is connected to a right end portion of the waist belt; a locking member that locks the left end portion of the waist belt and the left side belt which are connected to each other, and the right end portion of the waist belt and the right side belt which are connected to each other; and a pad member supported by the right rear portion of the waist belt via a rear support band, supported by the right end portion of the waist belt and the right side belt which are connected to each other via a front support band, and provided with a support member that supports a working machine.

Advantageous Effects of the Invention

According to the working machine support belt of the present invention, the load on the working machine can be more effectively distributed to the upper body compared to the related art. In addition, since the load on the working machine can be distributed around the entire waist of the operator, the deviation of the load that acts on a waist can be reduced, and fatigue due to a local load on the body of the operator can be reduced.

MODES FOR CARRYING OUT THE INVENTION

Hereinafter, an embodiment of the present invention will be described with reference to the attached drawings.

[Entire Configuration of Working Machine Support Belt]

Figure 1:
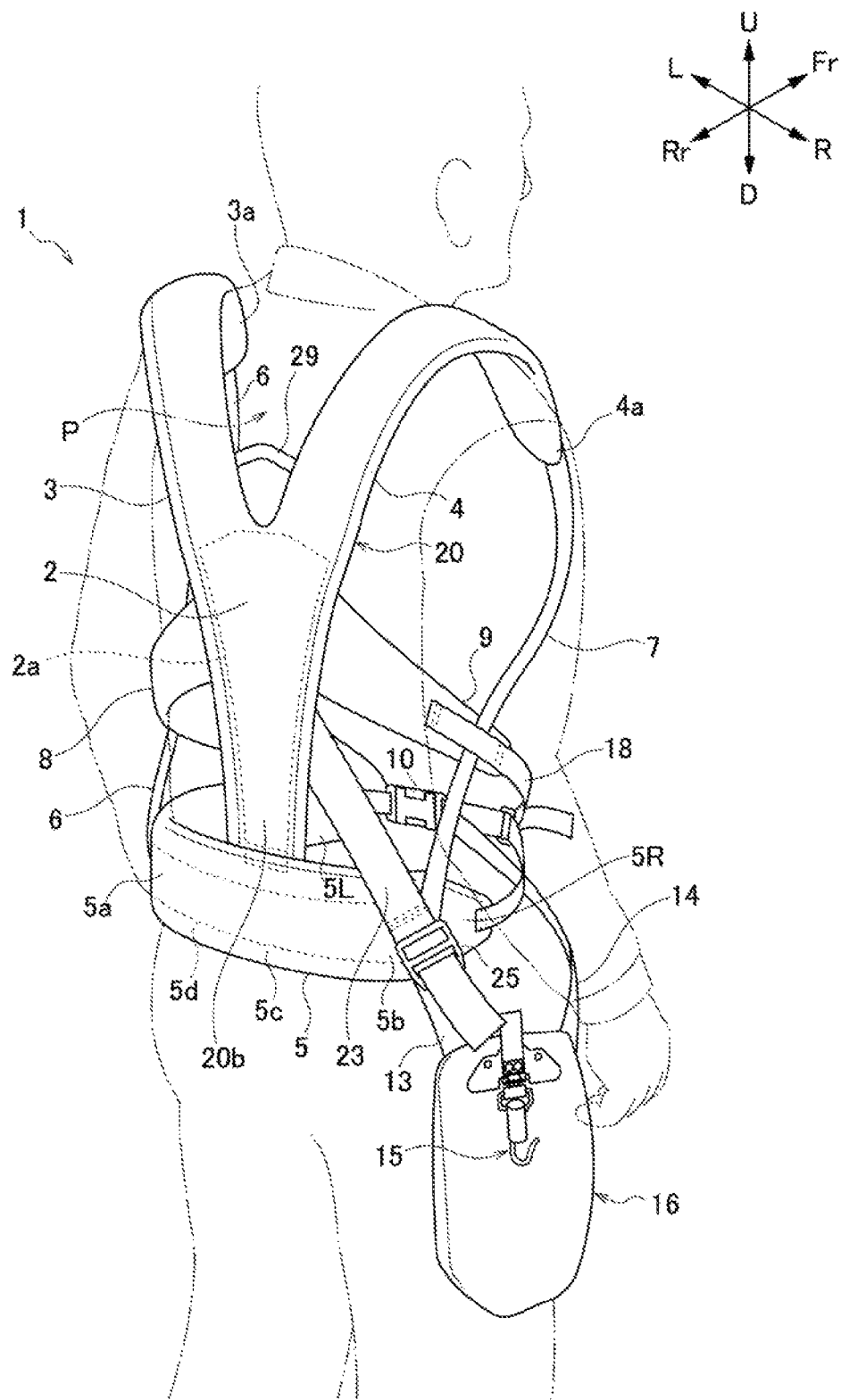
FIG. 1 is a perspective view illustrating a wearing state of a working machine support belt according to an embodiment of the present invention.
Figure 2:
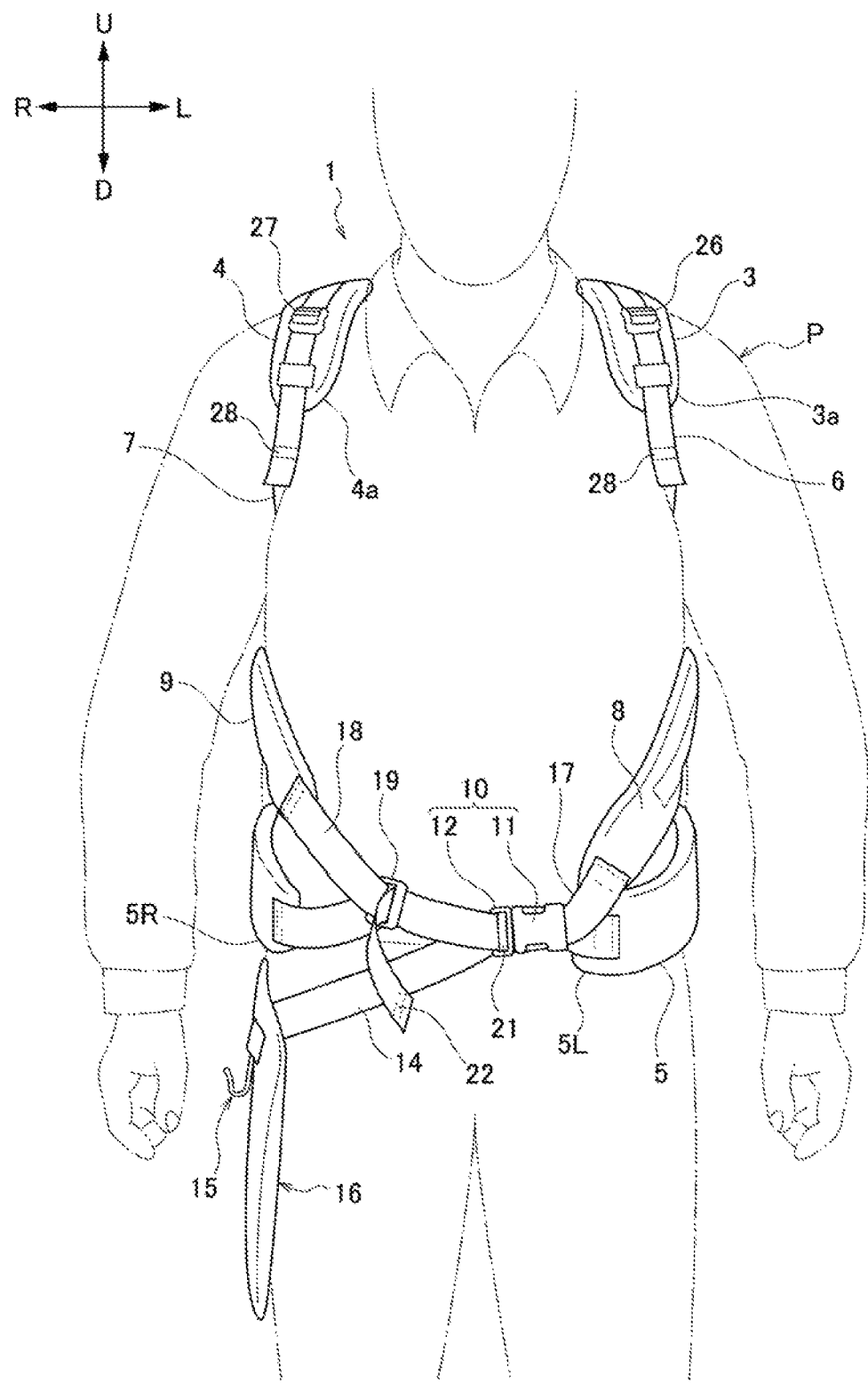
FIG. 2 is a front view illustrating a wearing state of the working machine support belt according to the embodiment of the present invention.
Figure 3:
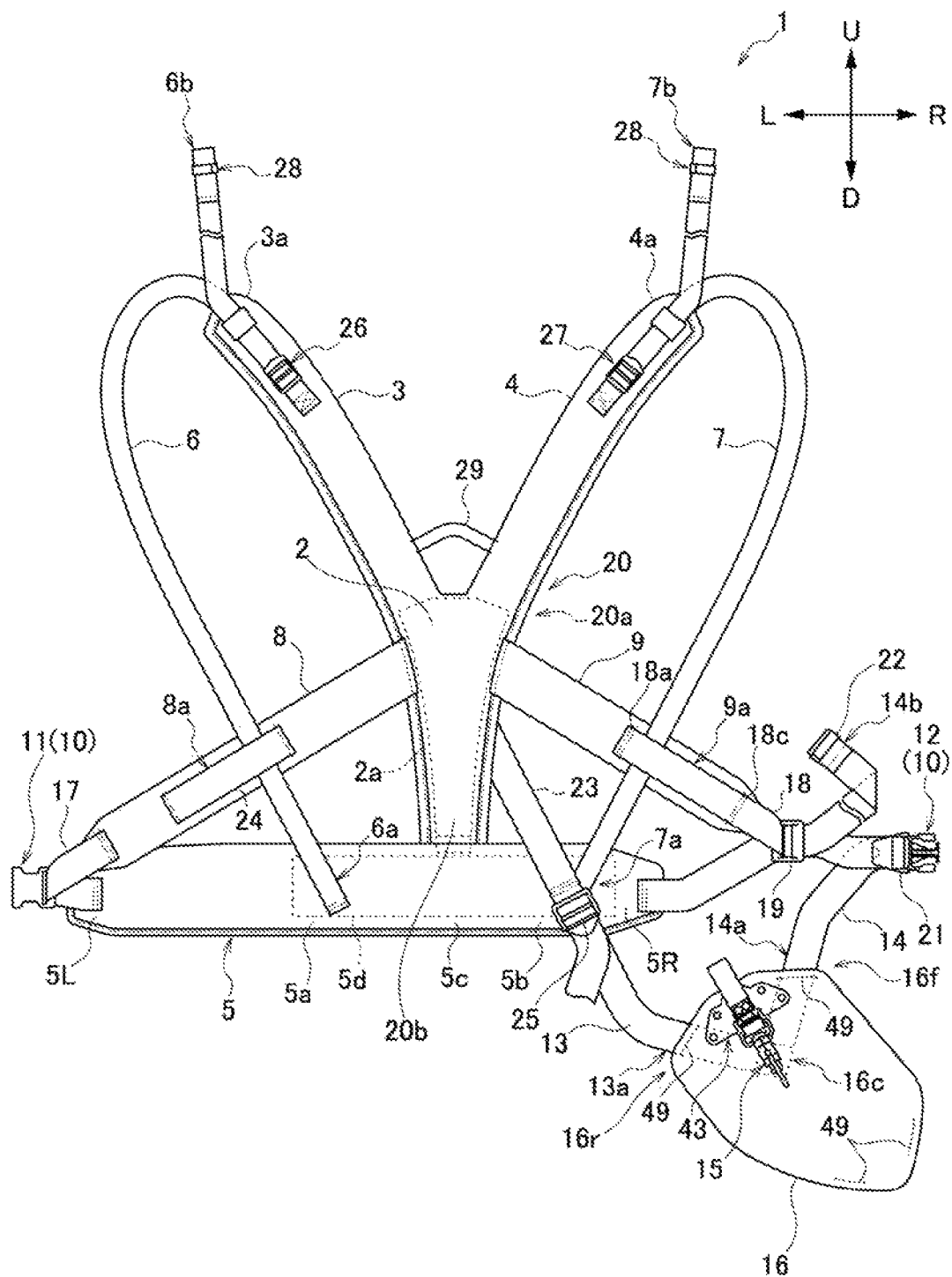
FIG. 3 is a rear view of the working machine support belt according to the embodiment of the present invention.

As illustrated in FIGS. 1 to 3, a working machine support belt 1 of the embodiment includes: a back plate portion 2; a left shoulder belt 3 and a right shoulder belt 4 that extend upward from an upper portion of the back plate portion 2 and turn to a front part of an operator P; a waist belt 5 that extends from a lower portion of the back plate portion 2 to both sides; a left suspender band 6 that connects a front lower portion 3a of the left shoulder belt 3 and a left rear portion 5a of the waist belt 5; a right suspender band 7 that connects a front lower portion 4a of the right shoulder belt 4 and the right rear portion 5b of the waist belt 5; a left side belt 8 that extends left-downward from the upper portion of the back plate portion 2, turns to the front part of the operator P, and is connected to a left end portion 5L of the waist belt 5; a right side belt 9 that extends right-downward from the upper portion of the back plate portion 2, turns to the front part of the operator P, and is connected to a right end portion 5R of the waist belt 5; a locking member 10 that locks the left end portion 5L of the waist belt 5 and the left side belt 8 which are connected to each other, and the right end portion 5R of the waist belt 5 and the right side belt 9 which are connected to each other; and a pad member 16 supported by the right rear portion 5b of the waist belt 5 via a rear support band 13, supported by the right end portion 5R of the waist belt 5 and the right side belt 9 which are connected to each other via a front support band 14, and provided with a hook 15 that supports a working machine (not illustrated). The back plate portion 2, the left shoulder belt 3, the right shoulder belt 4, the waist belt 5, the left side belt 8, and the right side belt 9 are made of cushion materials (not illustrated).

According to the above-described configuration, a load on the working machine can be distributed to an upper body of an operator P by the back plate portion 2, the left shoulder belt 3 and the left suspender band 6, the right shoulder belt 4 and the right suspender band 7, the left side belt 8, the right side belt 9, and the waist belt 5. Further, in the working machine support belt 1, by providing the left side belt 8 and the right side belt 9 and by locking the left end portion 5L of the waist belt 5 and the left side belt 8 which are connected to each other and the right end portion 5R of the waist belt 5 and the right side belt 9 which are connected to each other by the locking member 10, the load on the working machine can be distributed to the entire waist of the operator P, and thus, the deviation of the load that acts on the waist is reduced, and fatigue due to a local load on the body of the operator can be reduced. Further, since the back plate portion 2, the left shoulder belt 3, the right shoulder belt 4, the waist belt 5, the left side belt 8, and the right side belt 9 are made of cushion materials, the load on the operator P can further be provided.

The left shoulder belt 3 and the right shoulder belt 4 are formed integrally with the back plate portion 2 and configure a substantially Y-shaped belt main body 20. A lower end portion 20b of the belt main body 20 is connected to a center portion 5c of the waist belt 5. The back plate portion 2 and the waist belt 5 include reinforcing members 2a and 5d made of a hard resin member inside. According to the configuration, appropriate elasticity and rigidity can be imparted to the back plate portion 2 and the waist belt 5. Further, by using a hard resin member as the reinforcing member, it is possible to manufacture the working machine support belt 1 with a lighter weight and at a lower cost compared to a case where a metal is used for the reinforcing member.

The locking member 10 of the waist belt 5 is a side release type one-touch buckle, and includes a female member 11 as a left locking portion and a male member 12 as a right locking portion. In other words, the locking member 10 is configured such that a pair of locking pieces of the male member 12 is locked to a pair of locking recessed portions of the female member 11 by inserting the male member 12 into the female member 11, and the pair of locking pieces is disengaged from the pair of locking recessed portions by pushing the pair of locking pieces with a finger.

In addition, the working machine support belt 1 includes a reinforcing band 23 that connects the back plate portion 2 and the right rear portion 5b of the waist belt 5. The reinforcing band 23 is connected to the back plate portion 2 between a connection portion between the back plate portion 2 and the right side belt 9, and a connection portion between the back plate portion 2 and the waist belt portion 5, and the reinforcing pad 23 and the rear support band 13 are disposed substantially linearly. In this manner, since the reinforcing band 23 that connects the back plate portion 2 and the right rear portion 5b of the waist belt 5 is disposed substantially linearly with respect to the rear support band 13, the load on the working machine applied to the rear support band 13 can be appropriately received by the reinforcing band 23.

The left end portion 5L of the waist belt 5 and the left side belt 8 are connected to each other via a left connecting band 17. The right end portion 5R of the waist belt 5 and the right side belt 9 are connected to each other via a right connecting band 18. The left connecting band 17 is provided with the female member 11 of the locking member 10, and the front support band 14 is connected to the right connecting band 18 via a first length adjusting mechanism 19. The male member 12 of the locking member 10 is connected to the front support band 14 via a second length adjusting mechanism 21.

In addition, the right rear portion 5b of the waist belt 5 is provided with a third length adjusting mechanism 25, and the rear support band 13 is connected to the third length adjusting mechanism 25. The first length adjusting mechanism 19, the second length adjusting mechanism 21, and the third length adjusting mechanism 25 are ladder locks, for example. In this manner, since the front support band 14 is connected to the right connecting band 18 via the first length adjusting mechanism 19, by adjusting the length of the front support band 14, the length around the waist in the working machine support belt 1 can be adjusted.

Further, by changing a distance between the second length adjusting mechanism 21 and the pad member 16 in the front support band 14 and a distance between the third length adjusting mechanism 25 and the pad member 16 in the rear support band 13, the position of the hook 15 can be adjusted freely. In other words, by elongating both the distance between the second length adjusting mechanism 21 and the pad member 16 in the front support band 14 and the distance between the third length adjusting mechanism 25 and the pad member 16 in the rear support band 13, the position of the hook 15 can be lowered, and by shortening both the distance between the second length adjusting mechanism 21 and the pad member 16 in the front support band 14 and the distance between the third length adjusting mechanism 25 and the pad member 16 in the rear support band 13, the position of the hook 15 can be raised. Furthermore, by shortening the distance between the second length adjusting mechanism 21 and the pad member 16 in the front support band 14 and by elongating the distance between the third length adjusting mechanism 25 and the pad member 16 in the rear support band 13, the hook 15 can be moved forward, and by elongating the distance between the second length adjusting mechanism 21 and the pad member 16 in the front support band 14 and by shortening the distance between the third length adjusting mechanism 25 and the pad member 16 in the rear support band 13, the hook 15 can be moved rearward. In addition, manufacturing cost can be reduced by making the first length adjusting mechanism 19, the second length adjusting mechanism 21, and the third length adjusting mechanism 25 into a highly versatile ladder lock.

Length adjusting mechanisms 26 and 27 are provided in the front lower portions 3a and 4a of the left shoulder belt 3 and the right shoulder belt 4, respectively. The left suspender band 6 is connected to the front lower portion 3a of the left shoulder belt 3 via the length adjusting mechanism 26, and the right suspender band 7 is connected to the front lower portion 4a of the right shoulder belt 4 via the length adjusting mechanism 27. According to the configuration, by adjusting the length of the left suspender band 6 using the length adjusting mechanism 26 of the left shoulder belt 3, and by adjusting the length of the right suspender band 7 using the length adjusting mechanism 27 of the right shoulder belt 4, the position of the waist belt 5 can be adjusted in accordance with the operator P. In addition, the length adjusting mechanisms 26 and 27 are ladder locks, for example.

In the left suspender band 6, a base end portion 6a is stitched to the left rear portion 5a of the waist belt 5, and a tip end portion 6b side extends from the front lower portion 3a of the left shoulder belt 3 via the length adjusting mechanism 26. In the right suspender band 7, a base end portion 7a is stitched to the right rear portion 5b of the waist belt 5, and a tip end portion 7b side extends from the front lower portion 4a of the right shoulder belt 4 via the length adjusting mechanism 27. The right suspender band 7, the rear support band 13, and the reinforcing band 23 are gathered and stitched to the right rear portion 5b of the waist belt 5 to make the stitching work and the like easy.

A left through hole 8a into which the left suspender band 6 is inserted is provided in the left side belt 8, and a right through hole 9a into which the right suspender band 7 is inserted is provided in the right side belt 9. The left through hole 8a is formed by stitching both end portions of the band member 24 to the left side belt 8. The right through hole 9a is formed by stitching one end portion 18a and a middle portion 18c of the right connecting band 18 to the right side belt 9. In this manner, by making the left suspender band 6 inserted into the left through hole 8a provided in the left side belt 8, and by making the right suspender band 7 inserted into the right through hole 9a provided in the right side belt 9, the left suspender band 6 and the right suspender band 7 can be guided to a desired position, and thus, the integrity of the working machine support belt 1 can be improved, and the load on the working machine can be appropriately distributed to the upper body of the operator P. In addition, since the right through hole 9a of the right side belt 9 into which the right suspender band 7 is inserted is configured with a part of the right connecting band 18, the number of components can be reduced. in the front support band 14, a base end portion 14a is stitched and connected to the pad member 16, and a tip end portion 14b side extends via the second length adjusting mechanism 21 and the first length adjusting mechanism 19. A clip 22 is provided in the tip end portion 14b of the front support band 14 that serves as a free end. In this manner, since the clip 22 is provided in the tip end portion 14b of the front support band 14, flapping of the front support band 14 can be prevented by sandwiching the clip 22 by the right side belt 9 and the like.

Clips 28 are provided in the tip end portions 6b and 7b of the left suspender band 6 and the right suspender band 7, respectively. According to the configuration, flapping of the left suspender band 6 and the right suspender band 7 can be prevented by sandwiching each clip 28 between the left suspender band 6, the right suspender band 7 and the like.

In addition, the working machine support belt 1 includes a loop band 29 that connects the left shoulder belt 3 and the right shoulder belt 4 to each other above the back plate portion 2. According to the configuration, the working machine support belt 1 can be hooked using the loop band 29 when not in use.

Figure 7:
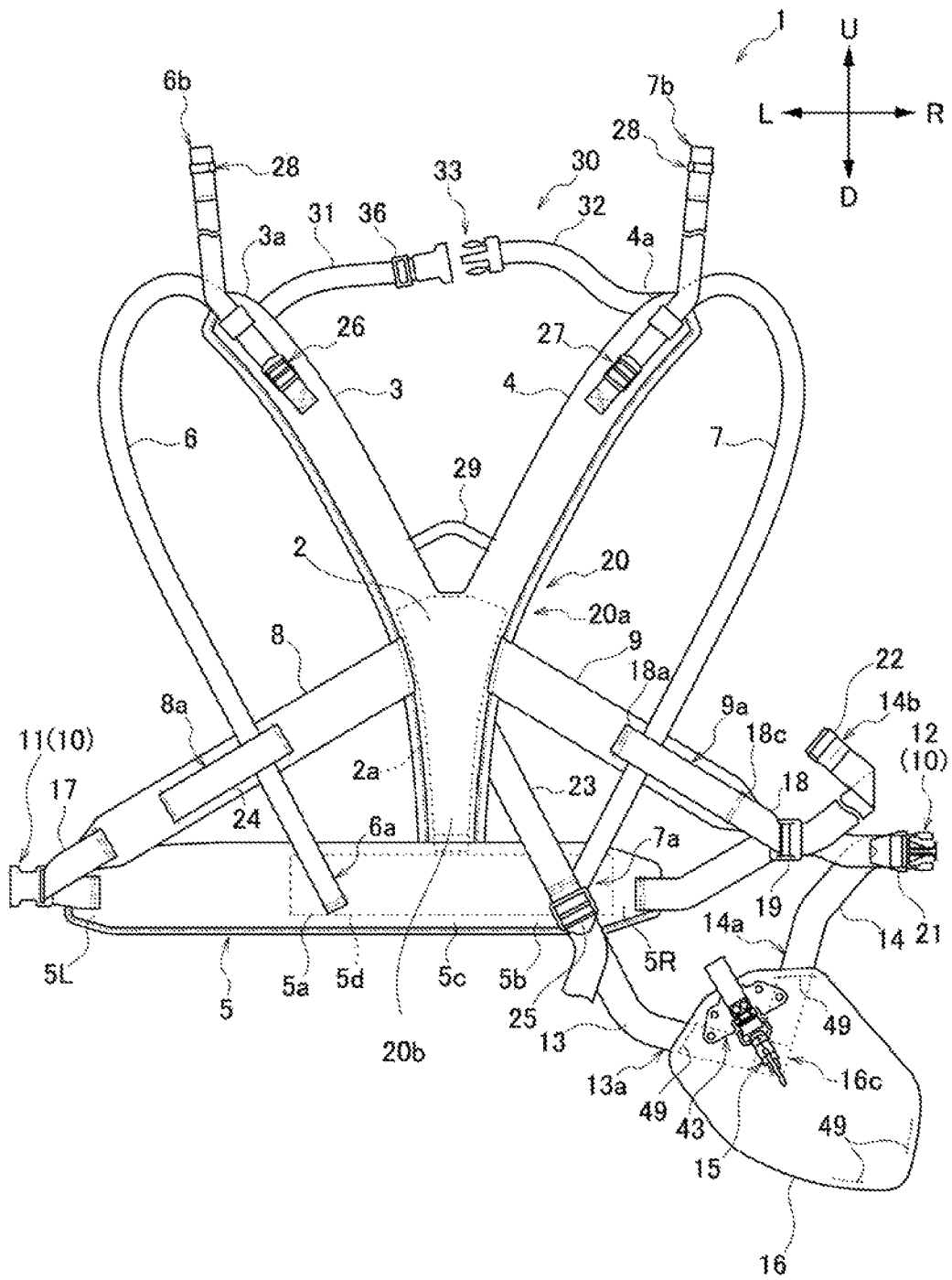
FIG. 7 is a rear view of the working machine support belt according to a modification example of the present invention.

Further, as illustrated in the modification example illustrated in FIG. 7, the working machine support belt 1 may include a chest belt 30 that connects the front lower portion 3a of the left shoulder belt 3 and the front lower portion 4a of the right shoulder belt 4. The chest belt 30 includes a left chest belt 31 fixed to the front lower portion 3a of the left shoulder belt 3, a right chest belt 32 fixed to the front lower portion 4a of the right shoulder belt 4, and a locking member 33 that locks the left chest belt 31 and the right chest belt 32. The chest belt 30 has a fourth length adjusting mechanism 36. According to the structure, by connecting the left shoulder belt 3 and the right shoulder belt 4 by the chest belt 30, the integrity of the working machine support belt 1 can be improved. In addition, by locking the left chest belt 31 and the right chest belt 32 by the locking member 33, attaching and detaching work of the working machine support belt 1 can be performed easily. Further, since the chest belt 30 has the fourth length adjusting mechanism 36, the left shoulder belt 3 and the right shoulder belt 4 can be fitted to the operator P.

[Pad Member and Supporting Structure Thereof]

Figure 4:
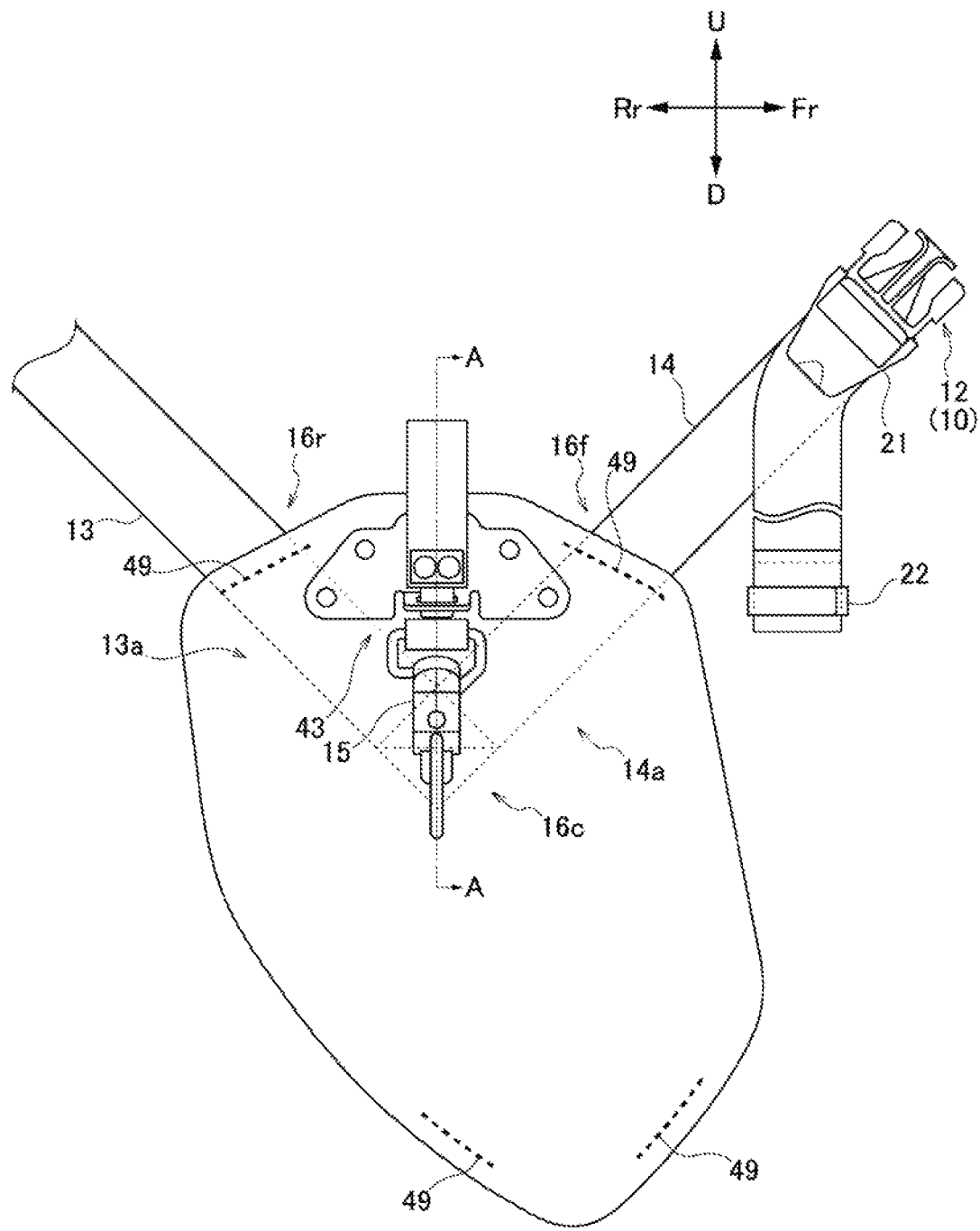
FIG. 4 is a view illustrating a pad member, a front support band, and a rear support band of the working machine support belt illustrated in FIG. 3.

As illustrated in FIG. 4, the base end portion 14a of the front support band 14 is stitched to the upper end portion of a front portion 16f of the pad member 16 and is stitched at a center portion 16c of the pad member 16. The base end portion 13a of the rear support band 13 is stitched to the upper end portion of a rear portion 16r of the pad member 16, and is stitched to the center portion 16c of the pad member 16. In this manner, by stitching the base end portion 14a of the front support band 14 and the base end portion 13a of the rear support band 13 at the center portion 16c of the pad member 16, stitching work can be performed easily.

Here, the front support band 14 and the rear support band 13 may be configured separately, or may be configured with a single band member. In a case where the front support band 14 and the rear support band 13 are configured with a single band member, the band member is folded back at the center portion 16c of the pad member 16. By configuring the front support band 14 and the rear support band 13 with a single band member, the number of components can be reduced.

Figure 5:
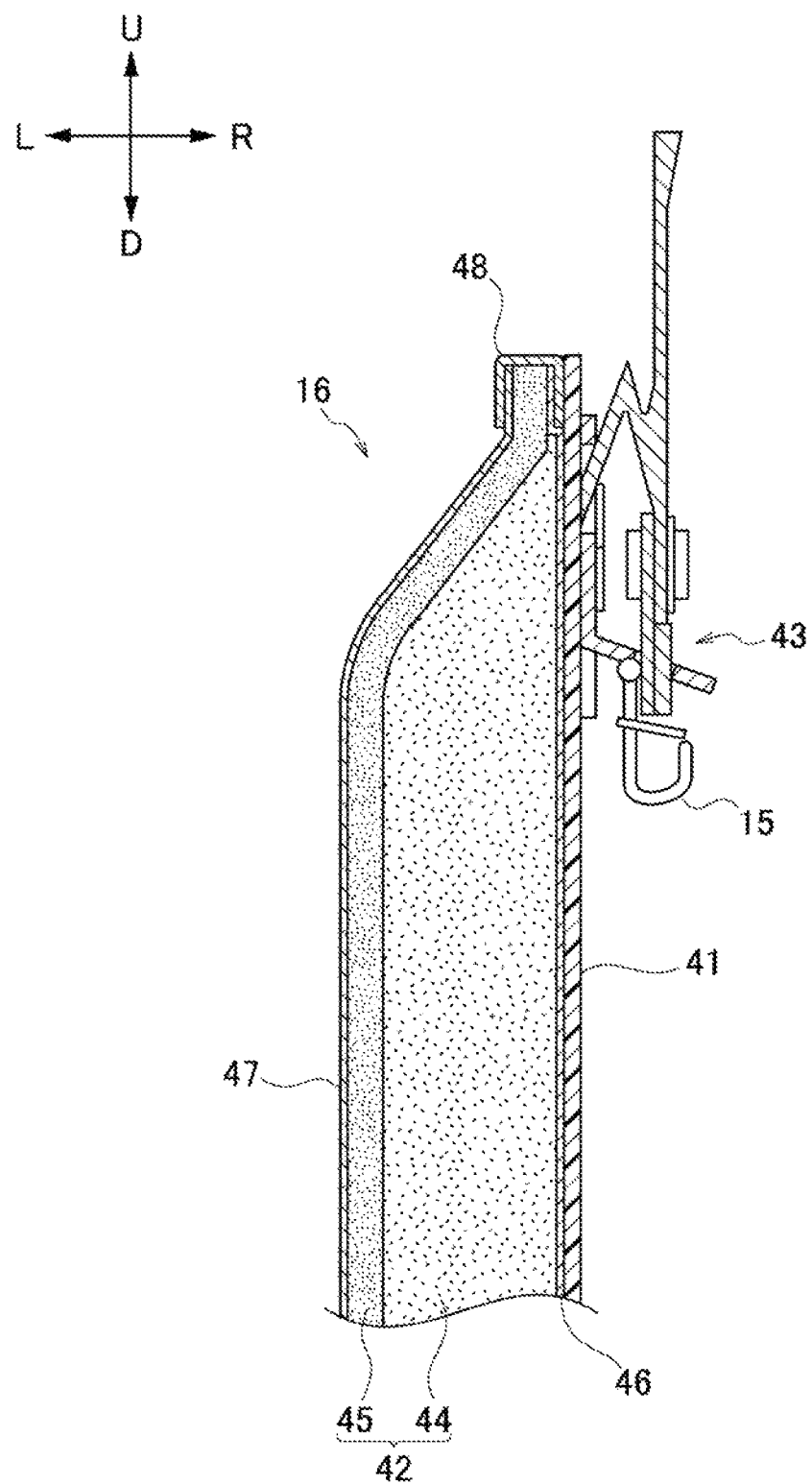
FIG. 5 is a sectional view taken along line A-A of FIG. 4.

As illustrated in FIG. 5, the pad member 16 includes a plate portion 41 disposed on the working machine side and a cushion portion 42 disposed on the operator P side and softer than the plate portion 41, and the hook 15 is attached to an outer surface of the plate portion 41 via a fixing metal fitting 43. In this manner, since the pad member 16 includes the hard plate portion 41 positioned on the working machine side and the soft cushion portion 42 positioned on the operator P side, the load or vibration on the working machine can be received by the plate portion 41, and the cushion portion 42 can protect the thigh of the operator P. In other words, since the cushion portion 42 is made of a cushion material and deforms along the shape of the thigh while reducing the load or vibration on the working machine, the load on the operator P can be reduced.

The cushion portion 42 includes a soft cushion portion 44 and a hard cushion portion 45 that is harder than the soft cushion portion 44, and the soft cushion portion 44 is disposed between the plate portion 41 and the hard cushion portion 45. In addition, the cushion portion 42 and the plate portion 41 are integrated by stitching the circumferential edge portions of the hard cushion portion 45 and the plate portion 41 at a plurality of locations. The plate portion 41 is made of resin, and the soft cushion portion 44 and the hard cushion portion 45 are made of sponge. In this manner, the cushion portion 42 has a two-layer structure of the soft cushion portion 44 and the hard cushion portion 45, and thus, the soft cushion portion 44 can absorb the vibration on the working machine and the hard cushion portion 45 can improve followability to the working machine. In addition, it is possible to satisfy both the vibration absorption performance and followability which are the characteristics that conflict with each other. Further, weight reduction and low cost can be realized by making the plate portion 41 with resin and making the soft cushion portion 44 and the hard cushion portion 45 with sponge.

The cushion portion 42 includes a first covering member 46 that covers the outer surface of the soft cushion portion 44, and a second covering member 47 that covers the outer surface of the hard cushion portion 45. With this configuration, deterioration of the soft cushion portion 44 and the hard cushion portion 45 is suppressed.

In addition, the cushion portion 42 includes a third covering member 48 having a substantially U-shaped section and interposing the outer edge portions of the hard cushion portion 45, the first covering member 46, and the second covering member 47, and the hard cushion portion 45, the first covering member 46, the second covering member 47, and the third covering member 48 are stitched to each other over the entire circumference. In this manner, by interposing the outer edge portions of the hard cushion portion 45, the first covering member 46, and the second covering member 47 with the third covering member 48, and by stitching the members over the entire circumference, the strength of the end portion of the hard cushion portion 45 can be improved, and the durability of the pad member 16 can be improved.

Figure 6:
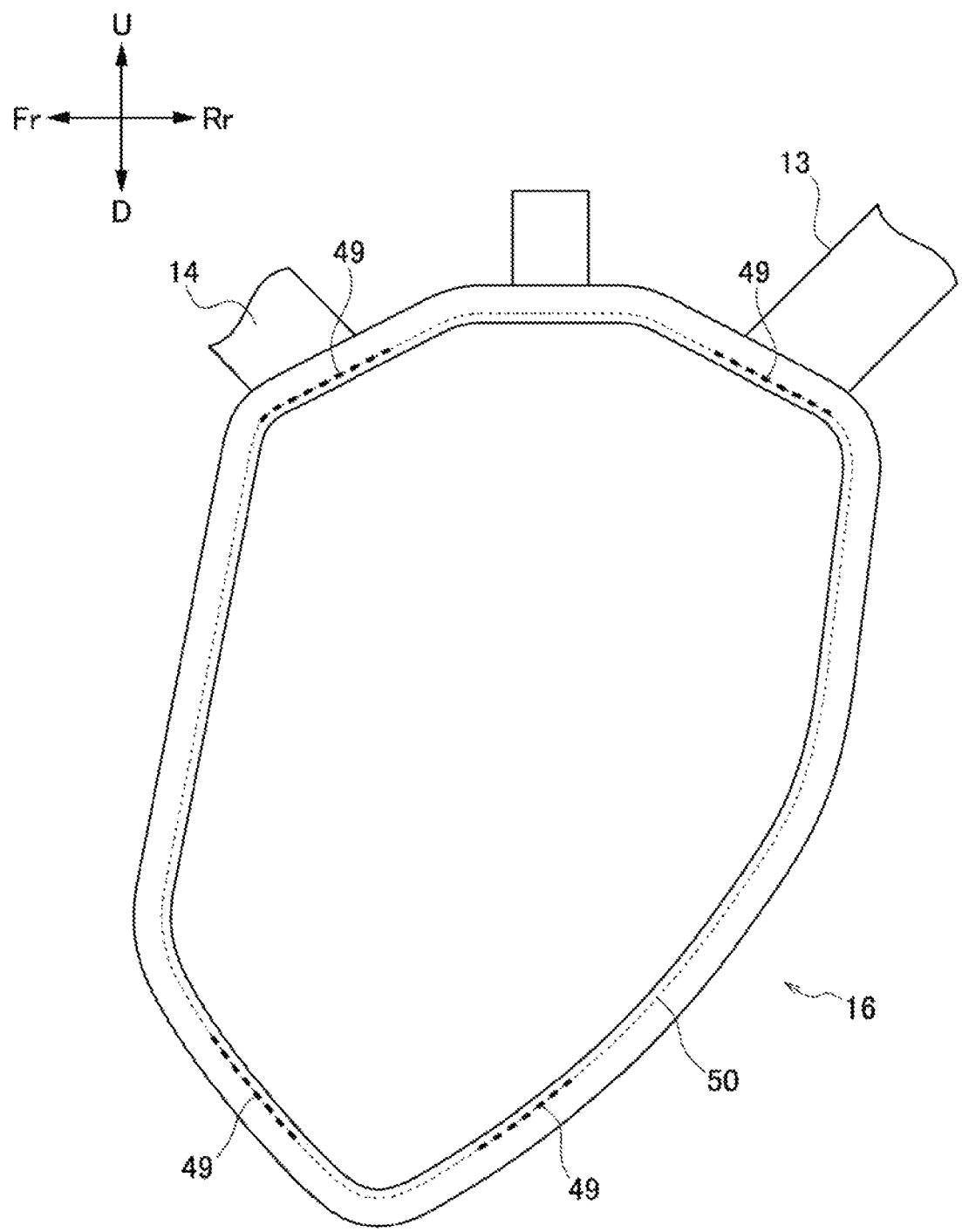
FIG. 6 is a back surface view of the pad member illustrated in FIG. 4.

As illustrated in FIG. 6, a stitching portion 49 of the hard cushion portion 45 and the plate portion 41 is substantially at the same position as a stitching portion 50 of the hard cushion portion 45, the first covering member 46, the second covering member 47, and the third covering member 48. In this manner, by making the positions of both the stitching portions 49 and 50 the same, it is possible to suppress the deterioration of the design of the pad member 16 by forming the stitching portions 49 and 50.

As illustrated in FIGS. 4 and 6, the stitching portions 49 of the hard cushion portion 45 and the plate portion 41 are provided at two locations on the upper and lower portions of the pad member 16. In this manner, by avoiding the center portion 16c of the pad member 16 that comes into contact with the working machine and disposing the stitching portion 49 only on the circumferential edge portion of the pad member 16, the deterioration of the stitching portion 49 due to contact with the working machine can be suppressed. In other words, since there is a low possibility that the working machine comes into contact with the stitching portion 49 in relation to the position of the hook 15, the deterioration of the stitching portion 49 can be suppressed.

In the example, the front support band 14 and the rear support band 13 are stitched to the upper two stitching portions 49 among four stitching portions 49 of the hard cushion portion 45 and the plate portion 41. In this manner, by stitching the front support band 14 and the rear support band 13 in the stitching portion 49 between the plate portion 41 and the cushion portion 42, the deterioration of the design of the pad member 16 can be suppressed by forming the stitching portion between the front support band 14 and the rear support band 13.

[Action]

In the working machine support belt 1 configured as described above, the load on the working machine can be distributed to the upper body of the operator P by the back plate portion 2, the left shoulder belt 3 and the left suspender band 6, the right shoulder belt 4 and the right suspender band 7, the left side belt 8, the right side belt 9, and the waist belt 5. Further, in the working machine support belt 1, by providing the right side belt 9 in addition to the left side belt 8 and by locking the left end portion 5L of the waist belt 5 and the left side belt 8 which are connected to each other and the right end portion 5R of the waist belt 5 and the right side belt 9 which are connected to each other by the locking member 10, the load on the working machine can be distributed to the entire waist of the operator P, and thus, the deviation of the load that acts on the waist is reduced, and fatigue due to a local load on the body of the operator can be reduced.

Further, since the working machine support belt 1 is provided with the second length adjusting mechanism 21 in the front support band 14 and the third length adjusting mechanism 25 is provided in the rear support band 13, by appropriately adjusting the members, the vertical and horizontal positions of the hook 15 can be freely adjusted. Furthermore, the working machine support belt 1 is provided with the first length adjusting mechanism 19 on the front support band 14 and the length adjusting mechanisms 26 and 27 are provided on the left suspender band 6 and the right suspender band 7, by adjusting the members in accordance with the physique of the person P, it is possible to adjust fitting feeling of the working machine support belt 1. For example, during heavy load work, the working machine support belt 1 is fitted tightly, and thus, a suspension load on a lawn mowing machine or a reaction force that accompanies to a lawn mowing work can be effectively distributed. Even during light work, work fatigue can be reduced by fitting the working machine support belt 1 appropriately.

In addition, the working machine support belt 1 may be applied to a two-hand handle type mowing machine with a U-shaped handle, and may be applied to a loop handle type mowing machine in which the loop handle is held by one hand and a bar of the working machine is held by the other hand. Further, the working machine support belt 1 can be used for the working machine, such as a blower, a high-pressure washing machine, and a sprayer, in addition to a mowing machine.

In addition, the above-described embodiment can be appropriately modified, improved, and the like. For example, in the above-described embodiment, a ladder lock is used as the length adjusting mechanism, but a mechanism other than the ladder lock may be used.

The present specification describes at least the following contents. In addition, in a parenthesis, the corresponding configuration elements and the like in the above-described embodiment are illustrated, but the invention is not limited thereto.

(1) A working machine support belt (working machine support belt 1) including: a back plate portion (back plate portion 2); a left shoulder belt (left shoulder belt 3) and a right shoulder belt (right shoulder belt 4) that extend upward from an upper portion of the back plate portion and turn forward; a waist belt (waist belt 5) that extends from a lower portion of the back plate portion to both sides; a left suspender band (left suspender band 6) that connects a front lower portion (front lower portion 3a) of the left shoulder belt and a left rear portion (left rear portion 5a) of the waist belt; a right suspender band (right suspender band 7) that connects a front lower portion (front lower portion 4a) of the right shoulder belt and the right rear portion (right rear portion 5b) of the waist belt; a left side belt (left side belt 8) that extends left-downward from the upper portion of the back plate portion, turns forward, and is connected to a left end portion (left end portion 5L) of the waist belt; a right side belt (right side belt 9) that extends right-downward from the upper portion of the back plate portion, turns forward, and is connected to a right end portion (right end portion 5R) of the waist belt; a locking member (locking member 10) that locks the left end portion of the waist belt and the left side belt which are connected to each other, and the right end portion of the waist belt and the right side belt which are connected to each other; and a band member (pad member 16) supported by the right rear portion of the waist belt via a rear support band (rear support band 13), supported by the right end portion of the waist belt and the right side belt which are connected to each other via a front support band (front support band 14), and provided with a support member (hook 15) that supports a working machine.

According to (1), the load on the working machine can be distributed to the upper body by the back plate portion, the left shoulder belt and the left suspender band, the right shoulder belt and the right suspender band, the left side belt, the right side belt, and the waist belt. Further, in the working machine support belt, by providing the right side belt in addition to the left side belt and by locking the left end portion of the waist belt and the left side belt which are connected to each other and the right end portion of the waist belt and the right side belt which are connected to each other by the locking member, the load on the working machine can be more effectively distributed to the upper body compared to the related art. In addition, since the load on the working machine can be distributed around the entire waist of the operator, the deviation of the load that acts on a waist can be reduced, and fatigue due to a local load on the body of the operator can be reduced.

(2) The working machine support belt according to (1), in which the left end portion of the waist belt and the left side belt are connected to each other via a left connecting band (left connecting band 17), in which the right end portion of the waist belt and the right side belt are connected to each other via a right connecting band (right connecting band 18), in which a left locking portion (female member 11) of the locking member is provided in the left connecting band, in which the front support band (front support band 14) is connected to the right connecting band via a first length adjusting mechanism (first length adjusting mechanism 19), and in which the right locking portion (male member 12) engaged with the left locking portion of the locking member is provided in the front support band.

According to (2), since the front support band is connected to the right connecting band via the first length adjusting mechanism, the length around the waist can be adjusted by adjusting the length of the front support band.

(3) The working machine support belt according to (2), in which the right locking portion is connected to the front support band via a second length adjusting mechanism (second length adjusting mechanism 21).

According to (3), the position of the support member can be adjusted by changing the distance between the second length adjusting mechanism and the pad member in the front support band.

(4) The working machine support belt according to (2) or (3), in which a clip (clip 22) is provided in a tip end portion of the front support band.

According to (4), since the clip is provided in the tip end portion of the front support band, flapping of the front support band can be prevented by sandwiching the clip by the right side belt and the like.

(5) The working machine support belt according to any one of (1) to (4), in which the working machine support belt further includes a reinforcing band (reinforcing band 23) that connects the back plate portion and the right rear portion of the waist belt, and in which the reinforcing band and the rear support band are disposed substantially linearly.

According to (5), since the reinforcing band that connects the back plate portion and the right rear portion of the waist belt is disposed substantially linearly with respect to the rear support band, the load on the working machine applied to the rear support band can be appropriately received by the reinforcing band.

(6) The working machine support belt according to any one of (1) to (5), in which the back plate portion, the left shoulder belt, the right shoulder belt, the waist belt, the left side belt, and the right side belt are made of cushion materials.

According to (6), since the back plate portion, the left shoulder belt, the right shoulder belt, the waist belt, the left side belt, and the right side belt are made of cushion materials, the load on the operator can further be provided.

(7) The working machine support belt according to any one of (1) to (6), in which a left through hole (left through hole 8a) into which the left suspender band is inserted is provided in the left side belt, and in which a right through hole (right through hole 9a) into which the right suspender band is inserted is provided in the right side belt.

According to (7), by making the left suspender band inserted into the left through hole provided in the left side belt, and by making the right suspender band inserted into the right through hole provided in the right side belt, the left suspender band and the right suspender band can be guided to a desired position, the integrity of the working machine support belt can be improved, and the load on the working machine can be appropriately distributed.

(8) The working machine support belt according to any one of (1) to (7), in which the working machine support belt is further provided with a loop band (loop band 29) that connects the left shoulder belt and the right shoulder belt to each other above the back plate portion.

According to (8), the working machine support belt can be hooked using the loop band when not in use.

(9) The working machine support belt according to any one of (1) to (8), in which the back plate portion includes a reinforcing member (reinforcing member 2a) made of a hard resin member inside.

According to (9), by providing the reinforcing member made of a hard resin member in the back plate portion, appropriate elasticity and rigidity can be imparted. Further, manufacturing can be performed with a lighter weight and at a lower cost compared to a case where a metal is used for the reinforcing member.

(10) The working machine support belt according to (2), in which a third length adjusting mechanism (third length adjusting mechanism 25) is provided in the right rear portion of the waist belt, and in which the rear support band is connected to the third length adjusting mechanism.

According to (10), since the rear support band is connected to the waist belt via the third length adjusting mechanism, by adjusting the distance between the second length adjusting mechanism and the pad member and the distance between the third length adjusting mechanism and the pad member, the position of the support member can be freely adjusted.

(11) The working machine support belt according to any one of (1) to (10), in which length adjusting mechanisms (length adjusting mechanisms 26 and 27) are respectively provided in the front lower portions of the left shoulder belt and the right should belt, in which the left suspender band is connected to the front lower portion of the left shoulder belt via the length adjusting mechanism, and in which the right suspender band is connected to the front lower portion of the right shoulder belt via the length adjusting mechanism.

According to (11), by adjusting the length of the left suspender band using the length adjusting mechanism of the left shoulder belt, and by adjusting the length of the right suspender band using the length adjusting mechanism of the right shoulder belt, the position of the waist belt can be adjusted in accordance with the operator.

(12) The working machine support belt according to (11), in which clips (clip 28) are provided in tip end portions (tip end portions 6*b* and 7*b*) of the left suspender band and the right suspender band, respectively.

According to (12), since the clips are respectively provided at the tip end portions of the left suspender band and the right suspender band, by sandwiching the clip between the left suspender band, the right suspender band and the like, the flapping of the left suspender band and the right suspender band can be prevented.

(13) The working machine support belt according to any one of (2) to (4), in which a left through hole (left through hole 8*a*) into which the left suspender band is inserted is provided in the left side belt, in which a right through hole (right through hole 9*a*) into which the right suspender band is inserted is provided in the right side belt, in which the left through hole is configured with a band member (band member 24) provided in the left side belt, and in which the right through hole is configured with the right connecting band.

According to (13), since the right through hole of the right side belt into which the right suspender band is inserted is configured with the right connecting band, the number of components can be reduced.

(14) The working machine support belt according to any one of (1) to (13), in which the working machine support belt is further provided with a chest belt (chest belt 30) that connects the front lower portion of the left shoulder belt and the front lower portion of the right shoulder belt to each other.

According to (14), by connecting the left shoulder belt and the right shoulder belt by the chest belt, the integrity of the working machine support belt can be improved.

(15) The working machine support belt according to (14), in which the chest belt includes a left chest belt (left chest belt 31) fixed to the front lower portion of the left shoulder belt, a right chest belt (right chest belt 32) fixed to the front lower portion of the right shoulder belt, and a locking member (locking member 33) that locks the left chest belt and the right chest belt.

According to (15), by locking the left chest belt and the right chest belt by the locking member, attaching and detaching work of the working machine support belt can be performed easily.

(16) The working machine support belt according to (14) or (15), in which the chest belt further includes a fourth length adjusting mechanism (fourth length adjusting mechanism 36).

According to (16), since the chest belt has the fourth length adjusting mechanism, the left shoulder belt and the right shoulder belt can be fitted by the operator.

(17) The working machine support belt according to any one of (1) to (16), in which the front support band and the rear support band are configured with a single band member.

According to (17), since the front support band and the rear support band are configured with a single band member, the number of components can be reduced.

DESCRIPTION OF REFERENCE NUMERALS AND SIGNS

1: working machine support belt
2: back plate portion
3: left shoulder belt
3*a*: front lower portion
4: right shoulder belt
4*a*: front lower portion
5: waist belt
5*a*: left rear portion
5*b*: right rear portion
5L: left end portion
5R: right end portion
6: left suspender band
6*b*: tip end portion
7: right suspender band
7*b*: tip end portion
8: left side belt
8*a*: left through hole
9: right side belt
9*a*: right through hole
10: locking member
11: female member (left locking portion)
12: male member (right locking portion)
13: rear support band
14: front support band
15: hook (support member)
16: pad member
17: left connecting band
18: right connecting band
19: first length adjusting mechanism
21: second length adjusting mechanism
22: clip
23: reinforcing band
24: band member
25: third length adjusting mechanism
26: length adjusting mechanism
27: length adjusting mechanism
28: clip
29: loop band
30: chest belt
31: left chest belt
32: right chest belt
33: locking member
36: fourth length adjusting mechanism

The invention claimed is:
1. A working machine support belt comprising:
a back plate portion;
a left shoulder belt and a right shoulder belt that extend upward from an upper portion of the back plate portion and turn forward;
a waist belt that extends from a lower portion of the back plate portion to both sides;
a left suspender band that connects a front lower portion of the left shoulder belt and a left rear portion of the waist belt;
a right suspender band that connects a front lower portion of the right shoulder belt and the right rear portion of the waist belt;
a left side belt that extends left-downward from the upper portion of the back plate portion, turns forward, and is connected to a left end portion of the waist belt;
a right side belt that extends right-downward from the upper portion of the back plate portion, turns forward, and is connected to a right end portion of the waist belt;

a locking member that locks the left end portion of the waist belt and the left side belt which are connected to each other, and the right end portion of the waist belt and the right side belt which are connected to each other; and a pad member supported by the right rear portion of the waist belt via a rear support band, supported by the right end portion of the waist belt and the right side belt which are connected to each other via the support band, and provided with a support member that supports a working machine, wherein a tip end of the right end portion of the waist belt and the right side belt are connected to each other via a right connecting band.

2. The working machine support belt according to claim 1, wherein:
the left end portion of the waist belt and the left side belt of the waist belt are connected to each other via a left connecting band;
a left locking portion of the locking member is provided in the left connecting band,
the front support band is connected to the right connecting band via a first length adjusting mechanism; and
the right locking portion engaged with the left locking portion of the locking member is provided in the front support band.

3. The working machine support belt according to claim 2, wherein
the right locking portion is connected to the front support band via a second length adjusting mechanism.

4. The working machine support belt according to claim 2, wherein
a clip is provided in a tip end portion of the front support band.

5. The working machine support belt according to claim 1, wherein:
the working machine support belt further includes a reinforcing band that connects the back plate portion and the right rear portion of the waist belt; and
the reinforcing band and the rear support band are disposed linearly.

6. The working machine support belt according to claim 1, wherein
the back plate portion, the left shoulder belt, the right shoulder belt, the waist belt, the left side belt, and the right side belt are made of cushion materials.

7. The working machine support belt according to claim 1, wherein:
a left through hole into which the left suspender band is inserted is provided in the left side belt; and
a right through hole into which the right suspender band is inserted is provided in the right side belt.

8. The working machine support belt according to claim 1, wherein
the working machine support belt is further provided with a loop band that connects the left shoulder belt and the right shoulder belt to each other above the back plate portion.

9. The working machine support belt according to claim 1, wherein
the back plate portion includes a reinforcing member made of a hard resin member inside.

10. The working machine support belt according to claim 2, wherein:
a third length adjusting mechanism is provided in the right rear portion of the waist belt; and
the rear support band is connected to the third length adjusting mechanism.

11. The working machine support belt according to claim 1, wherein:
length adjusting mechanisms are respectively provided in the front lower portions of the left shoulder belt and the right should belt;
the left suspender band is connected to the front lower portion of the left shoulder belt via the length adjusting mechanism; and
the right suspender band is connected to the front lower portion of the right shoulder belt via the length adjusting mechanism.

12. The working machine support belt according to claim 11, wherein
clips are provided in tip end portions of the left suspender band and the right suspender band, respectively.

13. The working machine support belt according to claim 2, wherein:
a left through hole into which the left suspender band is inserted is provided in the left side belt;
a right through hole into which the right suspender band is inserted is provided in the right side belt;
the left through hole is configured with a band member provided in the left side belt; and
the right through hole is configured with the right connecting band.

14. The working machine support belt according to claim 1, wherein
the working machine support belt is further provided with a chest belt that connects the front lower portion of the left shoulder belt and the front lower portion of the right shoulder belt to each other.

15. The working machine support belt according to claim 14, wherein
the chest belt includes:
a left chest belt fixed to the front lower portion of the left shoulder belt;
a right chest belt fixed to the front lower portion of the right shoulder belt; and
a locking member that locks the left chest belt and the right chest belt.

16. The working machine support belt according to claim 14, wherein
the chest belt further includes a fourth length adjusting mechanism.

17. The working machine support belt according to claim 1, wherein
the front support band and the rear support band are configured with a single band member.

* * * * *